United States Patent [19]

Muszynski

[11] 4,375,489

[45] Mar. 1, 1983

[54] VINYL ESTER POLYMER CONCRETE COMPOSITIONS COMPRISING FLY ASH

[75] Inventor: Larry C. Muszynski, Houston, Tex.

[73] Assignee: Shell Oil Company, Houston, Tex.

[21] Appl. No.: 250,979

[22] Filed: Apr. 3, 1981

[51] Int. Cl.³ .................. C08K 3/36; C08G 59/02
[52] U.S. Cl. .................. 428/36; 523/218; 523/466; 428/416; 428/418
[58] Field of Search ............ 260/42.28, 42.53; 428/418, 413, 416, 36; 523/218, 466

[56] References Cited

U.S. PATENT DOCUMENTS

| | | | |
|---|---|---|---|
| 2,633,458 | 3/1953 | Shokal | 260/45.2 |
| 3,141,861 | 7/1964 | Smith et al. | 260/42.28 |
| 3,336,241 | 8/1967 | Shokal | 260/2 |
| 3,377,406 | 4/1968 | Newey et al. | 260/837 |
| 3,420,914 | 1/1969 | May | 260/837 |
| 3,509,086 | 4/1970 | Rohrbacher | 428/418 |
| 3,830,776 | 8/1974 | Carlson et al. | 523/218 |
| 3,991,005 | 11/1976 | Wallace | 428/2 |
| 4,038,339 | 7/1977 | Foster | 428/418 |
| 4,091,148 | 5/1978 | Blankenhorn et al. | 428/413 |
| 4,210,457 | 7/1980 | Dodson et al. | 106/97 |
| 4,212,776 | 7/1980 | Martinez et al. | 428/418 |
| 4,246,162 | 1/1981 | Schreiber | 523/466 |
| 4,331,726 | 5/1982 | Cleary | 428/143 |

FOREIGN PATENT DOCUMENTS 49-26332 3/1974 Japan .................. 523/457

OTHER PUBLICATIONS

Chem. Abs., vol. 81 -79497w (1974), "Epoxy Ester Coating Comp.", Ohishi et al., Japan 26332 (3/8/74).
Chem. Abst., vol. 76 -144465x (1972), "Cement Products with High Mechanical Strength", Cerrone et al., DT2139208, 2/17/72.
Chem. Abst., vol. 66 -19429f (1967), "Epoxy Resin & Vinyl Ester Mortars", Esso Res. FR1437399, May 6, 1966.
Derwent Abst. 37883A/21, SV562536, 8/17/77.
Derwent Abst. 61059 B/33, SU577193, 8/11/77.

Primary Examiner—Melvyn I. Marquis
Assistant Examiner—Herbert J. Lilling
Attorney, Agent, or Firm—Norris E. Faringer

[57] ABSTRACT

Curable polymer concrete compositions suitable for articles of construction comprise (1) a minor amount of a vinyl ester resin composition, (2) a major amount of an aggregate blend comprising (a) sand and (b) fly ash and (3) a free-radical curing agent.

20 Claims, No Drawings

VINYL ESTER POLYMER CONCRETE COMPOSITIONS COMPRISING FLY ASH

BACKGROUND OF THE INVENTION

The use of polymeric materials in concrete formulations is well known. One common composite material is called polymer-impregnated concrete (PIC) wherein hardened portland cement concrete is impregnated with a liquid monomeric material which is subsequently polymerized in situ. These materials have remarkable durability and resistance against salts and the like which make their use especially attractive for concrete pipe, desalting plants, tunnel support linings and bridge decks. Another system is a polymer-portland cement concrete (PPCC) which is produced by adding a monomeric or polymeric material to a fresh portland cement concrete mixture which is subsequently cured and polymerized after placement. It will be appreciated that both the PIC and PPCC systems are hydraulic systems, i.e., they require the use of water to cure the portland cement. Accordingly, another system has more recently been dicovered which is called polymer concrete (PC) which contains little or no cement and no water. The PC is a composite formed by polymerizing a monomeric material with aggregate (gravel, sand, etc.).

The resin most often employed in present PC compositions are the so-called acrylate resins, especially, methyl methacrylate. These acrylate resins are relatively inexpensive; however, they suffer a multitude of serious shortcomings. For example, they exhibit high volatility, high toxicity, high flammability, and are explosive. More importantly, they exhibit high shrinkage which severely limits their useful life in some applications.

A number of the serious environmental shortcomings (toxicity, volatility, etc.) can be eliminated by the replacement of the methacrylate resins with polyester resins in combination with an aggregate composition containing fly ash. This unexpected and novel improvement is disclosed and claimed in copending patent application Ser. No. 250,990, filed Apr. 3, 1981. While the compositions of Ser. No. 250,990, reduced the number of environmental shortcomings of the non-fly ash methacrylate PC systems, the resulting PC compositions, while exhibiting improved physical properties, still exhibit too high shrinkage for many applications.

A novel PC composition has now been discovered which exhibits improved physical and chemical properties, especially reduced shrinkage after cure.

SUMMARY OF THE INVENTION

The present invention is directed to curable polymer concrete compositions, particularly suitable for articles of construction, comprising (1) an epoxy vinyl ester composition, (2) an aggregate blend comprising (a) sand and (b) fly ash, and (3) a free-radical curing agent (initiator).

These compositions are especially suitable for use in making pipe, bridge decks, building panels, tanks and the like. Articles of construction prepared from these novel compositions not only exhibit excellent chemical resistance and lower cost but also exhibit improved physical properties such as high strength and low shrinkage. For example, the cured compositions exhibit excellent resistance to projectiles and unexpectedly reduced shrinkage.

DESCRIPTION OF THE PREFERRED EMBODIMENTS

The present invention is directed to curable compositions, particularly suitable for articles of construction, comprising:
(1) from about 3% to about 15% by weight of a vinyl ester composition,
(2) from about 85% to about 97% by weight of an aggregate composition comprising:
  (a) from about 50% to about 95% by weight of sand,
  (b) from about 5% to about 50% by weight of fly ash, and
(3) a free radical curing agent, preferably an organic peroxide.

It will be appreciated that a portion of either the sand or the fly ash may be replaced with other materials, especially reinforcing materials, such as glass fibers or mats; metallic staples; fibers, or mats; polymeric materials such as rubber, plastics, etc; expanded mica (Vermiculite) and Pearlite, etc; and coarse aggregate (e.g., >20 mesh to 1½ inches).

Epoxy Vinyl Esters

The vinyl esters which are particularly suitable for use in the present compositions comprise the hydroxy-substituted ethylenically unsaturated vinyl esters obtained by the esterification of polyepoxides with ethylenically unsaturated carboxylic acids. These hydroxy-substituted ethylenically unsaturated vinyl esters may be further mofified by subsequent reaction of at least a portion of the pendant hydroxyl groups with an anhydride, preferably maleic anhydride. The resulting vinyl esters and/or modified vinyl esters are then preferably mixed or blended with at least one compatible unsaturated monomer, such as styrene. The preparation of these vinyl esters, modified vinyl esters and blends thereof is well known and form no part of the present invention. The preparation of suitable vinyl esters is described in U.S. Pat. Nos. 3,377,406 and 3,420,914, and so much of the disclosure relevant to the preparation, and cure, of vinyl esters is incorporated herein by reference.

Simply, the vinyl esters are prepared by esterifying a polyepoxide, preferably a glycidyl polyether of a polyhydric phenol such as the diglycidyl ether of 2,2-bis(4-hydroxyphenyl)propane, with at least one ethylenically unsaturated carboxylic acid, particularly a monocarboxylic acid such as acrylic or methacrylic acid, preferably in the presence of an esterification catalyst such as an "onium" salt or compound.

The polyepoxides used to prepare suitable vinyl ester compositions comprise those compounds containing at least one vicinal epoxy or oxirane group, i.e., at least one

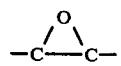

group. These polyepoxides may be saturated or unsaturated, aliphatic, cycloaliphatic, aromatic or heterocyclic and may be substituted if desired with non-interfering substitutents such as halogen atoms, hydroxyl groups, ether radicals, and the like. They may also be monomeric or polymeric.

For clarity, many of the polyepoxides and particularly those of the polymeric type are described in terms of epoxy equivalent values. The meanings of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. Nos. 3,377,406 and 3,420,914 and so much of the disclosure relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

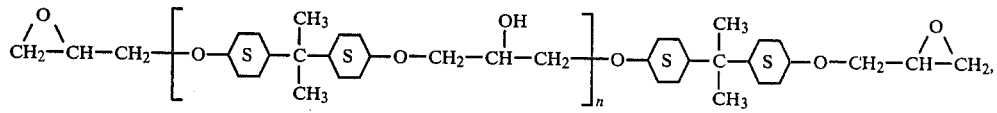

wherein n has a value so that the average molecular weight of the saturated polyepoxide is from about 350 to about 3,000.

Preferred saturated epoxy resins are the hydrogenated resins prepared by the process described in U.S. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

The organic unsaturated carboxylic acid used to esterify the polyepoxide may be aliphatic, cycloaliphatic or aromatic and may be monocarboxylic or polycarboxylic.

Particularly preferred acids to be utilized comprise the ethylenically unsaturated acids such as, for example, acrylic acid, methacrylic acid, crotonic acid, alpha-phenylacrylic acid, alpha-cyclohexylacrylic acid, maleic acid, alpha-chloromaleic acid, tetrahydrophthalic acid, itaconic acid, citraconic, fumaric acid, cyanoacrylic acid, methoxyacrylic acid, and the like.

Also preferred are the partial esters of polycarboxylic acids, and particularly the alkyl, alkenyl, cycloalkyl and cycloalkenyl esters of polycarboxylic acids such as for example, allyl hydrogen maleate, butyl hydrogen maleate, allyl hydrogen phthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

An esterification catalyst is not required, however, the use of such a catalyst is highly desired. In general, any esterification catalyst is suitable for use to prepare vinyl esters including the metal hydroxides such as sodium hydroxide; tin salts such as stannous octoate; phosphines such as triphenyl phosphine; the onium salts such as the phosphonium salts, including the phosphonium and ammonium halides.

Preferred esterification catalysts comprise the onium salts, and preferably those containing phosphorus, sulfur or nitrogen, such as, for example, the phosphonium, sulfonium and ammonium salts of inorganic acids. Examples of these include, among others, benzyltrimethylammonium sulfate, tetramethylammonium chloride, benzyltrimethylammonium sulfate, tetramethylammonium chloride, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium chloride, dicyclohexyldialkylphosphonium iodide, benzyltrimethylammonium thiocyanate, and the like, and mixtures thereof.

Preferred onium salts to be employed include those of the formula:

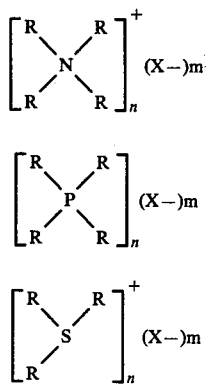

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, m is the valency of the X ion and n=m.

The amount of above-noted polyepoxide and acids will vary within limits. In general, suitable vinyl esters will be produced if one chemical equivalent of polyepoxide is reacted with from about 0.95 to about 1.25 chemical equivalents of the acid, and preferably from about 0.95 to about 1.05. As used herein and in the appended claims, a chemical equivalent amount of polyepoxide refers to that amount which furnishes one epoxy group and a chemical equivalent amount of acid refers to that amount which furnishes one carboxyl group.

The amount of the catalyst employed may also vary over a considerable range. In general, the amount of the catalyst will vary from about 0.01% to about 3% by weight, and more preferably from 0.1% to 2% by weight of the reactants.

The esterification reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for sometime after its formation, it may also be desirable to remove the catalyst used in the preparation, such as by stripping, neutralization and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.015 eq/100 grams or below.

The process for preparing the vinyl esters may be effected in any suitable manner. The preferred method merely comprises adding the polyepoxide, acid, catalyst, and solvent or diluent if desired, in any order and then applying the necessary heat to bring about the reaction. The reaction mixture may then be distilled or stripped to remove any of the unnecessary components, such as solvent, catalyst, excess reactants and the like.

Of course, many other additives and/or process modifications known to those skilled in the art may be employed as desired. For example, free radical inhibitors and stabilizers such as hydroquinone, monomethyl hydroquinone, phenothiazene, dialkyl hydroxylamines (e.g., diethyl hydroxylamine), trialkylphosphites, maleic anhydride, and the like may be added during the esterification and/or to the vinyl ester product. Also, the use of air/$N_2$ mixtures may be employed during the esterification step to inhibit vinyl polymerization.

The vinyl esters obtained by the above process will vary from liquids to solid resins. The products will possess a plurality of free OH groups and both epoxide and ethylenic groups. The products will be of higher molecular weight than the basic polyepoxide from which they are formed.

The vinyl esters may be mixed or blended with one or more compatible unsaturated monomers for some uses and such blends are generally preferred.

Useful blends in a weight basis of vinyl ester to comonomer comprise from about 95:1 to about 30:70, with from about 80:20 to about 50:50 being preferred.

Examples of such comonomers include, among others, aromatic compounds such as styrene, alpha-methylstyrene, dichlorostyrene, vinyl naphthalene, vinyl phenol and the like, unsaturated esters, such as acrylic and methacrylic esters, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl mateate, divinyl adipate, dichloroallyl tetrahydrophthalate, and the like, and mixtures thereof.

Especially preferred unsaturated comonomers are the aromatic unsaturated compounds such as styrene, vinyl toluene, divinyl benzene, etc.

The resulting vinyl ester or vinyl ester blend can be cured (hardened) by the addition of a curing agent.

Aggregate

As noted hereinbefore, an essential component in the present composition is a blend of at least sand and fly ash.

In general, the sand which is preferred in the present composition is the sand derived from the crushing of rock and the like. In other words, the sand has been obtained as a fractured product and exhibits an irregular and somewhat sharp feel. This sand is required in conventional hydraulic concretes and mortars to impart the necessary structural strength. The so-called "beach" sand which has been uniformly rounded by the wind and/or water action, in general, produces poor physical properties in hydraulic concretes and conventional PC compositions; however, such sands, while not as good as fractured sand, can be used in the present compositions to give good physical properties not exhibited by conventional PC compositions.

In general, the sand which is suitable in the present compositions is a relatively dense silica material having a particle size from about 5 mesh to about 100 mesh, with from about 20 to about 40 mesh being preferred.

The preferred sand is a crushed or fractured sand rather than the so-called beach or river bank sand which has been rounded by the action of wind and water. It will be appreciated, however, that for some applications where the ultimate properties of the cured PC composition are not a premium consideration, these sands or blends with fractured sands may be employed.

Fly ash is derived as a by product of the firing of coal. It will be appreciated that because of the differences in coal sources, coal compositions, as well as coal-firing equipment and techniques and firing practices in the industry, the physical properties, chemical compositions and pozzolanic activity of the fly ashes will vary markedly. The extent and rate of pozzolanic reaction involving fly ashes is apparently a function of several factors, including the quantity of lime, cement, total silica and/or alumina in the fly ash. For example, DOT report No. FHWA-IP-76-16, states that fly ashes having large amounts of free lime as indicated by CaO content tend to be very reactive and probably exhibit some degree of self-hardening. The following Table I (taken from U.S. 4,210,457) details the typical chemical analysis of fly ashes from sources A through K (source not identified). Table I gives the approximate percent by weight of $SiO_2$; $Al_2O_3$; and $Fe_2O_3$; combined $SiO_2$, $Al_2O_3$ and $Fe_2O_3$; CaO; MgO; and $SO_3$ found as well as the loss on ignition (LOI) for each of the fly ash samples A through K, as calculated according to ASTM C114-77. Also shown in Table I is the percentage of "free lime" as calculated according to ASTM C-25, Section 28.3 (1972).

For some structural applications, gravel (pea to egg size) may be incorporated into the composition. In general, up to about 50% and preferably up to about 25% of the sand/fly ash blend may be replaced with gravel.

Also, for producing lightweight and insulating materials, a portion, of say up to about 25% of the sand/fly ash blend may be replaced with an insulating material such as expanded mica and the like.

Free Radical Curing Agents

As noted hereinbefore, the vinyl esters and blends thereof, are preferably cured via free-radical curing agents (initiators).

Examples of suitable vinyl ester curing agents (catalysts) are the free-radical yielding compounds and suitable U.V.-radiation. Examples of such catalysts includes the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide. Tetralin hydroperoxide, phenylcyclohexane hydroperoxide, tertiary butylisopropylbenzene hydroperoxide, tertiary butylperacetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-dimethylvaleronitrile, 2,2'-azobisisotulyamide, and the like. Particularly preferred catalysts include the diaroyl peroxide, tertiary alkyl hydroperoxides, alkyl peresters of percarboxylic acids and particularly those of the above noted groups which contain no more than 18 carbon atoms per molecule and have a decomposition temperature below 125° C. The amount of free radical initiator will be a curing amount and will generally vary from about 1% to about 15% by weight based on the vinyl ester resin.

Of course, other materials may be mixed or added, including, plasticizers, stabilizers, extenders, oils, resins, tars, asphalts, pigments, reinforcing agents, thioxotropic

TABLE I

| Chemical Components | SOURCE | | | | | | | | | | |
|---|---|---|---|---|---|---|---|---|---|---|---|
| | A | B | C | D | E | F | G | H | I | J | K |
| % $SiO_2$ | 31.4 | 43.1 | 37.6 | 24.1 | 39.8 | 48.9 | 52.2 | 47.1 | 43.3 | 47.6 | 56.5 |
| $Al_2O_3$ | 19.7 | 21.8 | 27.5 | 14.3 | 16.8 | 29.6 | 31.0 | 20.8 | 18.5 | 23.3 | 24.7 |
| $Fe_2O_3$ | 6.6 | 4.2 | 7.3 | 9.5 | 6.8 | 9.3 | 8.3 | 16.0 | 29.9 | 16.0 | 5.6 |
| CaO | 20.2 | 23.5 | 17.9 | 29.6 | 16.8 | 6.2 | 4.9 | 5.0 | 4.3 | 7.6 | 7.7 |
| MgO | 3.9 | 3.8 | 3.7 | 8.5 | 5.3 | 0.7 | 0.7 | 1.8 | 0.9 | 3.2 | 2.0 |
| $SO_3$ | 6.4 | 1.6 | 5.7 | 5.9 | 2.8 | 0.6 | 0.3 | 0.6 | 1.2 | 0.7 | 0.5 |
| Loss on Ignition | 1.4 | 0.5 | 0.5 | 0.6 | 0.3 | 2.3 | 4.2 | 2.8 | 1.2 | 0.6 | 1.2 |
| $SiO_2$ + $Al_2O_3$ + $Fe_2O_3$ | 57.7 | 69.1 | 72.4 | 47.9 | 63.4 | 87.8 | 91.5 | 83.9 | 91.7 | 86.9 | 1.8 |
| Free Lime | 1.35 | 1.91 | 0.93 | 3.63 | 0.83 | 0.44 | 0.0 | 0.63 | 0.54 | 0.13 | 1.45 |

Table I is presented herein for illustration of typical properties only. The fly ashes employed in the present compositions were not analyzed for chemical content. While the activity of the several fly ashes varied somewhat, no fly ash was found that was inoperable in the present compositions. Accordingly, one skilled in the art would be advised to vary the amount and source of the fly ash to optimize the properties of the instant compositions commensurate with his end use objectives.

As noted hereinbefore, both the sand and fly ash may be replaced in part with gravel, crushed stone, expanded mica and other silica and inorganic materials; expanded polymers; metal fibers, staples, bars and/or mesh; glass fibers or mats; etc.

agents, and the like.

The compositions of the present invention are simply prepared by mixing the components together, placing the blend into a suitable mold or form and allowed to cure or harden. In general, the polymerization temperature will vary from about 0° C. to about 200° C. and more preferably from about 20° C. to about 100° C.

The instant compositions may be utilized in the preparation of a wide variety of articles, especially articles of construction such as pipes, pipe linings, building panels, armor plating, bridge deck and dam spillway overlays, etc.

The following examples are given to illustrate the instant compositions. It should be understood that the examples are given for the purpose of illustration only and the invention is not to be regarded as limited to and specific component or specific conditions recited therein. Unless otherwise indicated parts and percentages are by weight.

Vinyl Ester Resin A is a vinyl ester resin-styrene blend containing 62.5 parts by weight of a vinyl ester prepared by reacting one mole of a glycidyl polyether of 2,2-bis(4-hydroxyphenyl)propane having an epoxy equivalent weight of about 375 and an average molecular weight of about 920 with two moles of methacrylic acid in the presence of an esterification catalyst, and 37.5 parts by weight of styrene.

EXAMPLE I

This example illustrates the fabrication of pipe using the instant vinyl ester polymer concrete composition.

10,306 grams of flint course silica sand, 2,576 grams of fly ash (17% wt) were blended together. To 2,098 grams of Vinyl Ester Resin A were added 6.3 grams of cobalt naphthenate and the mixture thoroughly mixed and then 42.0 grams of methyl ethyl ketone peroxide added and thoroughly mixed. The catalyzed resin was then added to the aggregate blend and the resulting slurry mixed for 3 to 4 minutes. The slurry was then poured into a hopper which gravity feeds into an auger screw delivery system which displaced the polymer concrete material into a waxed cardboard mold one foot long, having an outside diameter of twelve inches and an inside diameter of ten inches (wall thickness of one inch). The mold was mounted between two flat vertical plates, grooved for the cardboard mold, which were connected to each other by equal length rods and driven by a variable speed motor. After the polymer concrete composition was displaced into the cardboard drum, the drum was revolved at approximately 300 rpm for 60 minutes. The mold was then removed from the grooved flat plates and the pipe stripped from the mold. The pipe was then postcured at about 93° C. (200° F.) for one hour, after which it was removed and allowed to cool. The pipe was tested according to ASTM C-497, "External Load Crushing Strength Test by the Three Edge Bearing Method". The crushing strength for the polymer concrete pipe averaged 5600 pounds per linear foot, which is almost three times the crushing strength of a concrete pipe having the same diameter and wall thickness.

EXAMPLE II

This example illustrates the resistance to projectiles of the present polymer concrete compositions.

The procedure of Example I was repeated wherein a polymer concrete composition containing 85% aggregate, which contained 80% sand and 20% fly ash, and 15% Vinyl Ester Resin A (containing 2% by weight of MEKP based on the Vinyl Ester) was prepared. To this composition were added 6% by weight based on the composition of steel deformed end fibers (conventional concrete hooked end staples having an average size and guage of 30 mm long and 0.4 mm diameter) and the reinforced mixture molded into blocks 3"×6"×12" and cured at 20° C. for 60 minutes and then postcured at 95° C. for 30 minutes. The cured blocks were taken to a firing range. At 25 yards, a 0.225 high velocity rifle bullet and a 0.308 NATO projectile were fired at the blocks. The blocks repelled both high velocity projectiles thus illustrating the superior impact resistance and anti-fragmentation properties of the instant polymer concrete compositions. The 0.223 and 0.308 bullets would either pass through conventional concrete or severely fragment the concrete. It will be appreciated that the 0.308 projectile will pass through two-½ inch thick steel plates.

The instant reinforced polymer concrete blocks were barely chipped on the surface by either projectile.

EXAMPLE III

This example illustrates the use of non-fractured sand in the present polymer concrete compositions.

The procedures of Example I were essentially repeated wherein various polymer concrete compositions were prepared using "contaminated" rounded sand obtained from Saudi Arabia, both with and without fly ash, as well as conventional "fractured" sand.

The respective compositions are as follows (all compositions contained 2% by weight of methyl ethyl ketone peroxide [MEKP] and 0.6% by weight of cobalt naphthenate based on the weight of Vinyl Ester Resin A):

| Composition | Parts By Weight |
|---|---|
| Composition A | |
| Vinyl Ester A | 15 |
| Aggregate | 85 |
| (a) Saudi Dune Sand 50% | |
| 71% < 100 mesh | |
| 22% #50 mesh | |
| 7% #30 mesh | |
| (b) Saudi Coarse River Gravel 50% | |
| 42% #12 mesh | |
| 43% #30 mesh | |
| 15% #50 mesh | |
| Composition B | |
| Vinyl Ester A | 16 |
| Aggregate (Sand #17) | 84 |
| 9% 40 mesh | |
| 41% 50 mesh | |
| 31% 70 mesh | |
| 14% 100 mesh | |
| 5% passing 100 mesh | |
| Composition C | |
| Vinyl Ester A | 10 |
| Aggregate | 90 |
| (a) 50/50 Saudi Blend of Composition A-80% | |
| (b) Fly ash 20% | |
| Composition D | |
| Vinyl Ester A | 14 |
| Aggregate | 86 |
| (a) Sand #17-80% | |
| (b) Fly ash-20% | |

The above compositions were cured at room temperature for 1 hour and then post cured at 95° C. for 30 minutes. The flexural and compressive strength of the cured compositions were then determined and the data is presented in Table II.

TABLE II

| COMPOSITION | COMPRESSIVE STRENGTH, PSI | FLEXURAL STRENGTH, PSI |
|---|---|---|
| A | 10,860 | 3,460 |
| B | 13,880 | 3,530 |
| C | 13,140 | 3,950 |
| D | 17,740 | 5,760 |

EXAMPLE IV

This example illustrates the reduced shrinkage exhibited by the present PC compositions. The following data was obtained by a U.S. Government Agency.

Sand used in the compositions had the following composition:
35% passed ⅜" retained #4
16% passed #4, retained #8
12.4% passed #8, retained #16
9.5% passed #16, retained #30
6.9% passed #35, retained #50
5.4% passed #50, retained #100
3.8% passed #100

Slab samples approximately 3"×9"×18" were prepared and cured at room temperature for 1 hour from the following composition:

| Composition | Parts By Weight |
|---|---|
| Vinyl Ester A | 6 |
| Sand | 82.7 |
| Fly Ash | 11.3 |
| Cumene hydroperoxide | 3%* |
| Cobalt Naphthenate | 0.6%* |

*% by weight based on Vinyl Ester A

The procedure was essentially repeated wherein an equivalent amount of a commercial polyester-styrene blend and neat methylmethacrylate were substituted for Vinyl Ester Resin A.

Shrinkage of the cured PC samples was then determined. The data was as follows:

| | Shrinkage, % |
|---|---|
| Vinyl Ester A | 0.15–0.17 |
| Polyester | 0.40–0.45 |
| Methyl methacrylate | >0.5 |

It is generally considered that the shrinkage must be <0.25% to avoid cracking in PC coatings which are exposed to water, especially hot water. For example, PC compositions which are used in bridge decks, pipe linings, dam spillway overlays, etc. must exhibit a shrinkage of <0.25% to prevent cracking and delamination.

EXAMPLE V

The instant vinyl ester-sand/fly ash compositions were found to be suitable for the following applications: (1) pipe linings, especially hot water and chemical pipe linings, (2) tank linings, (3) bridge deck and dam spillway overlays, (4) armor coatings, (5) foundation pads and (6) wall panels. The instant compositions are very suitable for use as interior and/or exterior linings for metallic as well as nonmetallic (cement concrete, plastic, resin, glass, etc.) pipe.

The pipe may be fabricated by well-known techniques wherein a substrate (carrier) such as a metal pipe is coated with the present composition and cured. Of course, the substrate layer may be coated with a composition such as a resin, an epoxy resin, or it may be treated with one or more compositions to enhance the adhesion of the instant vinyl ester polymer concrete compositions to the substrate. Also, one or more layers, i.e., a laminated structure, may be employed. For example, a metallic pipe may be coated with a glass, plastic, and/or resinous coating before the application of the instant vinyl ester polymer concrete compositions. Accordingly, "substrate" as used herein is deemed to mean any layer, however thin, including coating layers, other than a layer of the instant polymer concrete composition. The additional use of a reinforcement material, which may be metallic or non-metallic, in the polymer concrete is useful, for example, glass or plastic (nylon) fibers, webs or mats may be incorporated therein.

EXAMPLE VI

Related improved results are achieved when the vinyl ester is a 50:50 blend of vinyl ester and styrene, said vinyl ester being prepared by first reacting 2 moles of methacrylic acid and one mole of a diglycidyl polyether of 2,2-bis(4-hydroxyphenyl)propane having a WPE of about 180, an average molecular weight of about 360 and then esterifying about 10% of the secondary hydroxyl groups with maleic anhydride.

What is claimed is:
1. A curable polymer concrete composition, suitable for articles of construction, comprising
    (1) from about 3% to about 15% by weight of a vinyl ester composition prepared by esterifying an epoxy resin containing at least one vicinal-epoxy group in the molecule with an ethylenically unsaturated carboxylic acid,
    (2) from about 85% to about 97% by weight of an aggregate composition comprising
        (a) from about 50% to about 95% by weight of sand,
        (b) from about 5% to about 50% by weight of fly ash, and
    (3) a free-radical initiator.
2. The composition of claim 1 wherein the epoxy resin is a glycidyl polyether of a polyhydric phenol.
3. The composition of claim 2 wherein the epoxy resin is a glycidyl polyether of 2,2-bis(4-hydroxyphenyl)propane.
4. The composition of claim 1 wherein the ethylenically unsaturated carboxylic acid is a monocarboxylic acid.
5. The composition of claim 4 wherein the monocarboxylic acid is acrylic or methacrylic acid.
6. The composition of claim 4 wherein the vinyl ester has been further modified by reaction with a polycarboxylic acid anhydride.
7. The composition of claim 1 wherein the vinyl ester composition comprises from about 50% to about 80% vinyl ester and from about 20% to about 50% by weight of styrene.
8. The composition of claim 1 wherein a metallic reinforcing material is additionally incorporated in the composition.
9. The composition of claim 1 wherein the aggregate composition contains up to about 25% by weight of gravel.
10. The composition of claim 1 wherein the free-radical initiator is a peroxide.
11. The composition of claim 10 wherein the peroxide is methyl ethyl ketone peroxide.
12. The composition of claim 10 wherein the peroxide is cumene hydroperoxide.
13. An article of construction comprising a composition prepared by curing a composition comprising
    (1) from about 3% to about 15% by weight of a vinyl ester composition prepared by esterifying an epoxy resin containing at least one vicinal-epoxy group in the molecule with an ethylenically unsaturated carboxylic acid,
    (2) from about 85% to about 97% by weight of an aggregate composition comprising
        (a) from about 50% to about 95% by weight of sand,

(b) from about 5% to about 50% by weight of fly ash, and (3) a free-radical initiator.

14. The article of claim 13 wherein the epoxy resin is a glycidyl polyether of 2,2-bis(4-hydroxyphenyl)propane and the unsaturated monocarboxylic acid is acrylic or methacrylic acid.

15. The article of claim 13 wherein the vinyl ester composition comprises from about 50% to about 80% vinyl ester and from about 20% to about 50% by weight of styrene.

16. An article comprising at least one substrate layer and at least one layer prepared by curing a polymer concrete composition comprising (1) from about 3% to about 15% by weight of a vinyl ester composition prepared by esterifying an epoxy resin containing at least one vicinal-epoxy group in the molecule with an ethylenically unsaturated carboxylic acid, (2) from about 85% to about 97% by weight of an aggregate composition comprising (a) from about 50% to about 95% by weight of sand, (b) from about 5% to about 50% by weight of fly ash, and (3) a free-radical initiator.

17. The article of claim 11 wherein at least one substrate is metallic.

18. The article of claim 17 wherein the substrate is a pipe.

19. The article of claim 18 wherein the pipe has been coated with an epoxy resin composition.

20. The article of claim 16 wherein the polymer concrete composition contains at least one reinforcing material.

* * * * *